United States Patent
Krampen et al.

(10) Patent No.: US 9,280,409 B2
(45) Date of Patent: Mar. 8, 2016

(54) METHOD AND SYSTEM FOR SINGLE POINT OF FAILURE ANALYSIS AND REMEDIATION

(75) Inventors: Stefan Krampen, Cologne (DE); Kay Wolf, Cologne (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 117 days.

(21) Appl. No.: 14/239,407

(22) PCT Filed: Oct. 28, 2011

(86) PCT No.: PCT/US2011/058353
§ 371 (c)(1),
(2), (4) Date: Feb. 18, 2014

(87) PCT Pub. No.: WO2013/062585
PCT Pub. Date: May 2, 2013

(65) Prior Publication Data
US 2014/0208167 A1   Jul. 24, 2014

(51) Int. Cl.
*G06F 11/07* (2006.01)
*G06F 11/22* (2006.01)

(52) U.S. Cl.
CPC .......... *G06F 11/079* (2013.01); *G06F 11/2257* (2013.01)

(58) Field of Classification Search
CPC . G06F 11/2257; G06F 11/079; G06F 13/387; G06F 2213/4004; H04L 67/2838; H04L 67/32
See application file for complete search history.

(56) References Cited

U.S. PATENT DOCUMENTS

| 6,223,143 | B1 | 4/2001 | Weinstock et al. |
| 7,475,293 | B1 | 1/2009 | Little |
| 7,539,907 | B1 * | 5/2009 | Johnsen et al. ............... 714/47.2 |
| 7,583,605 | B2 * | 9/2009 | Esfandiari et al. ............ 370/248 |
| 8,489,721 | B1 * | 7/2013 | Gokhale et al. ............... 709/223 |
| 2003/0041201 | A1 | 2/2003 | Rauscher |
| 2004/0054618 | A1 | 3/2004 | Chang et al. |
| 2006/0064481 | A1 | 3/2006 | Baron et al. |
| 2006/0104199 | A1 * | 5/2006 | Katukam et al. ............. 370/216 |
| 2006/0224399 | A1 | 10/2006 | Alkemper et al. |

(Continued)

FOREIGN PATENT DOCUMENTS

WO   WO-9524807   9/1995

OTHER PUBLICATIONS

Control-Z I.T., "Single Point of Failure (SPOF) Analysis"; Ctrl (Z) Information Technology; Oct. 3, 2011, 2 pages, <http://www.pushcontrolz.com/spof.php>.
European Patent Office, Extended European Search Report, issued in European patent App. No. 11874526, dated Jun. 23, 2015.

(Continued)

*Primary Examiner* — Nadeem Iqbal
(74) *Attorney, Agent, or Firm* — Hewlett Packard Enterprise Patent Department (57) ABSTRACT

Embodiments of the present invention disclose a method and system for single point of failure analysis (SPOF) and remediation. According to one embodiment, a SPOF analysis is performed based on component configuration information associated with a plurality of system components. Based on the SPOF analysis, at least one SPOF component is identified. In addition, remediation information for the identified SPOF is computed based on the component configuration information. The result of the SPOF analysis and the remediation information are then displayed to an operating user.

13 Claims, 10 Drawing Sheets

(56) References Cited

U.S. PATENT DOCUMENTS

| | | | |
|---|---|---|---|
| 2008/0071807 A1 | 3/2008 | Pappu et al. | |
| 2008/0201397 A1 | 8/2008 | Peng et al. | |
| 2008/0221834 A1 | 9/2008 | Damodharan | |
| 2009/0254894 A1* | 10/2009 | Chen et al. | 717/155 |
| 2011/0047410 A1* | 2/2011 | Fujita et al. | 714/6.2 |
| 2011/0231715 A1 | 9/2011 | Kunii | |

OTHER PUBLICATIONS

International Bureau, "International Preliminary Report on Patentability," dated Apr. 29, 2014, issued in PCT App. No. PCT/US2011/058353.

U.S. Appl. No. 10/986,675, filed Nov. 12, 2004, Suresh Katukam (CISCO).

"Single Point of Failure (SPOF) Analysis"; Ctrl (Z) Information Technology; 2 pages.

Jae-Hwee Doh, et al.; "Single Event Upset Analysis for Satellite Transponder"; The Institute of Electronics Engineers of Korea; 2009 Autumn Conference; vol. 32, No. 2, pp. 301-302, Nov. 2009 See abstract and pp. 301-302.

PCT; "Notification of Transmittal of the International Search Report and the Written Opinion of the International Searching Authority, or the Declaration"; cited in PCT/US2011/058353; mailed Apr. 24, 2012; 9 pages.

* cited by examiner

METHOD AND SYSTEM FOR SINGLE POINT OF FAILURE ANALYSIS AND REMEDIATION

BACKGROUND

Today, numerous companies rely on information technology (IT) for managing their day to day business. As such, the reliability of the systems and networks thereof is of great importance to many IT companies. In order to enhance reliability, IT service providers utilize component redundancy, in which a secondary component is provided within the system for providing redundant functionality as a primary component such that failure of the primary component allows the second component to remain active and protect the system from potential failure. Additionally, the infrastructure and architecture of such systems often contain certain points (i.e., single points of failure) that increase the risk of outage during failure of a particular component. Furthermore, these points of failure are difficult to detect and often result in significantly negative effects on the IT infrastructure and business process.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Unless specifically stated otherwise as apparent from the following discussions, it is appreciated that throughout the description of embodiments, discussions utilizing terms such as "detecting," "determining," "operating," "using," "accessing," "comparing," "associating," "deleting," "adding," "updating," "receiving," "transmitting," "inputting," "outputting," "creating," "obtaining," "executing," "storing," "generating," "annotating," "extracting," "causing," "transforming data," "modifying data to transform the state of a computer system," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

There are many methods for detecting single points of failure within an IT infrastructure. The detection of single point of failure is typically done inconsistently as there are much more effective methods for SPOF analysis. For example, one prior solution simply predicts the failure rate of a particular system component, but fails to provide any guidance or recourse in the case of failure. As such, there is a need in the art to develop a consistent framework, method and set of tools based on industry standard methods for discovering single point of failures and determine alternatives for remediation.

Examples of the present invention disclose a method and system for detecting single point(s) of failure for components within an information technology infrastructure and architectural design. According to one example, the present configuration comprises of a robust method and set of tools for assessing the dependability of IT environments. Based on a sophisticated SPOF processing engine having a various computational modules, component reliability and dependency are analyzed within an identified scope, such that redundancy remediation is provided for components having a lower reliability rating and dependency status. Examples of the invention thereby enable support architects and consultants to perform a tool-based single point of failure analysis and resolution promptly and efficiently.

Figure 1:
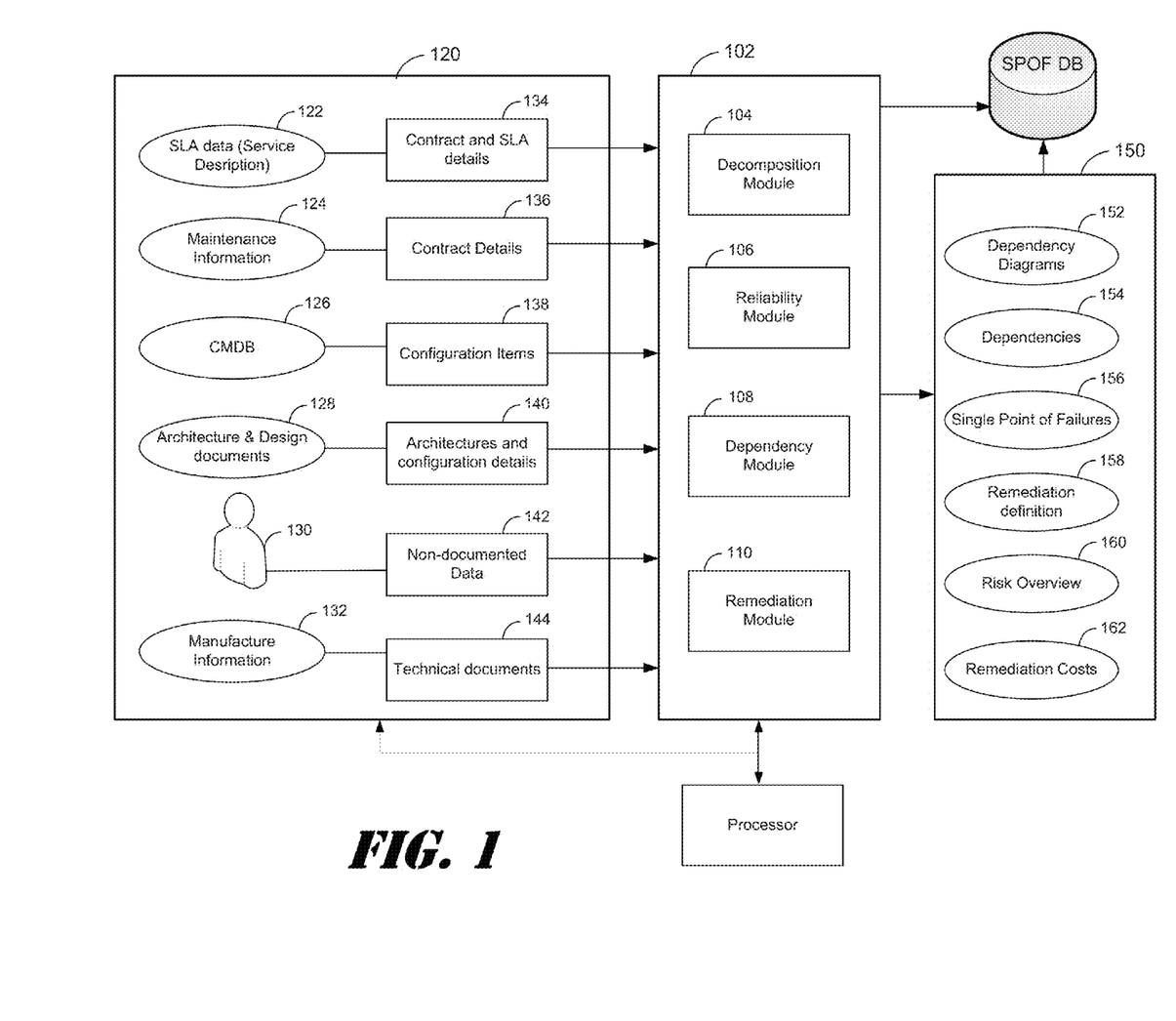
FIG. 1 illustrates a simplified block diagram of a system for identifying, analyzing and managing single point of failures (SPOF) according to an embodiment of the present invention.

Referring now in more detail to the drawings in which like numerals identify corresponding parts throughout the views, FIG. 1 illustrates a simplified block diagram of a system for identifying, analyzing and managing single point of failures (SPOF), according to an embodiment of the present invention. As shown here, the data environment includes input data factors 134, 136, 138, 140, 142, 144 processed by SPOF Engine 102 (from data sources 122, 124, 126, 128, 130, 132 of data 120), and output results 152-162 provided by SPOF Engine 102. The service level agreement (SLA) data repository 122 may include data factor 134, which comprises of contract data, elements of service level agreement (SLA) terms and conditions, such as component availability, business processes, criticality, and/or dependencies between single or groups of business processes.

Input data factor 136 stems from maintenance repository 124 and provides data such as the details relating to maintenance contract details or the availability of spare parts for configuration items from configuration management database (CMDB) 126. Moreover, data factor 136 may provide additional elements such as mean-time-to-repair (MTTR) information for configuration items from CMDB 126. Furthermore, the configuration management database 126 may include information on the hardware and operating system/applications of the IT infrastructure. Input data factor 138 may be provided by CMDB 126 to the SPOF Engine 102. The configuration management database may be an information repository that houses data related to components of an IT information system.

Information provided by input data factor 138 may include infrastructure data, such as for example, a description of the system configuration, equipment, operational statistics, historical performance, number of users, load information, etc. Such information may then be analyzed and/or correlated by SPOF Engine 102 for use within algorithm associated with the modules 104-110 (described in FIGS. 3-6). For example, the number of users, the degree of automation (e.g., number of failovers, redundant systems present), number of open and closed problems or incident tickets, and the number of changes, may serve as indicators of, or have a direct impact on, the stability of the system.

Moreover, input data factor 138 may also include reliability statistics on infrastructure hardware and/or software components of the CMDB (e.g., mean-time-between-failure (MTBF), mean-time-to-repair (MTTR) and/or mean-time-to-failure (MTTF)). Additionally, if such information is not described within the CMDB, the input data factor 138 can provide this information through manual input.

Data repository 128 provides architecture and design documents as input data factor 140. That is, input data factor 140 may provide architectural and design information such as the cooperation between infrastructure components and modules, interfaces between analyzed components and other services, application and components for example. If the availability of an analyzed component is dependent on other components which are not considered in the current SPOF analysis, then the analyzed component may be considered as a candidate for a single point of failure. Data factor 140 may also provide data such as technical requirements for analyzed systems for example.

Input data factor 142 is information provided by architects, engineers or Production Environment Management (PEM) 130. Data factor 142 is mostly undocumented data that is given during the interview session (process 704, 706 of FIG. 7A) and includes data such as undocumented problems with systems and processes, undocumented dependencies between infrastructure components, systems or services and/or descriptions of manual procedures for example. Furthermore, the manufactures of the infrastructure data repository 132 produces input data factor 144, which includes data provided by the system such as technical documents, error descriptions or mean-time-between-failure (MTBF) data for example.

SPOF output data 150 is stored within the SPOF data base 112. The data is analyzed and reworked into the different modules (104-110) within the SPOF engine 102. Dependencies diagrams 152 are generated by the SPOF Engine 102 and represent a list of all configuration items and systems and interdependencies between system components. Meanwhile, dependencies 154 are a list or a table of all detected dependencies for the configurable system components/items (CIs). Single point of failure output 156 comprises of a list of all single point(s) of failure as result of the SPOF analysis. According to one example embodiment, remediation definition 158 includes the descriptions, suggestions and/or solutions to remediate the defined single point of failures, while risk overview output 160 gives an overview of risks based on the defined single point(s) of failure. Lastly, remediation costs 162 list the estimated costs of the single point of failure remediation projects.

Figure 2:
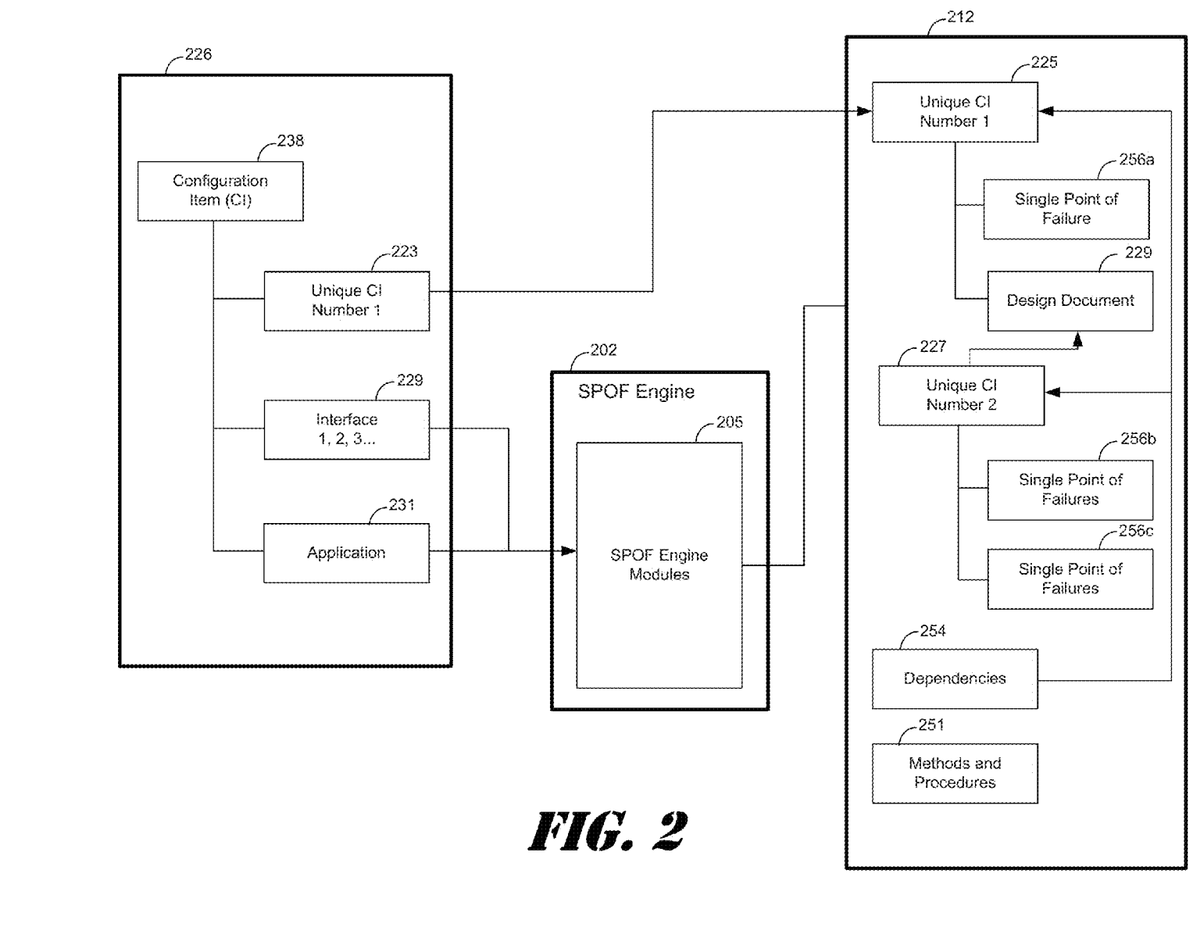
FIG. 2 illustrates a simplified block diagram of the CMDB and SPOF database according to an example of the present invention.

FIG. 2 illustrates the SPOF data base 212 and the relationship to the CMDB 226. According to one example, the SPOF database 212 is a relational database and includes all information which supports the SPOF analysis. Temporary results which cannot be saved into the CMDB 226 may be stored in the SPOF database 212. Still further, the SPOF database includes all data, information and procedures 222 which are not stored into the CMDB 226. As such, the SPOF database 212 becomes a logical extension of the standard CMDB 226. As shown in the present example, a data connection 224 is established between the CMDB 226 and SPOF database 212 so that all results may be linked to configuration items 238 stored into the CMDB 226. In order to match SPOF related information and data (e.g., data 210 and 212) to configuration items 238 from the CMDB 226, both the SPOF database 212 and the CMDB 226 utilize unique keys 223, 225 defined and provided from CMDB. In one example, the unique key 223 is defined in the CMDB 226 as a configuration item (CI) number, which represents a unique number in the CMDB and also used as the unique key 225 for the SPOF database 212.

Each configuration item or unique identifier 225, 227 in the SPOF database 212 is linked to dependent information stored into the SPOF database 212 such as single points of failure 256a-256c, design document 229, and dependencies 254 for example. The SPOF database 212 also includes all possible methods and procedures 251 which are used to perform the SPOF analysis based on the definition provided by the decomposition module 204 as will be explained in further detail with reference to FIG. 3.

Single Point of Failure Modeling Engine
Decomposition Module

Figure 3:
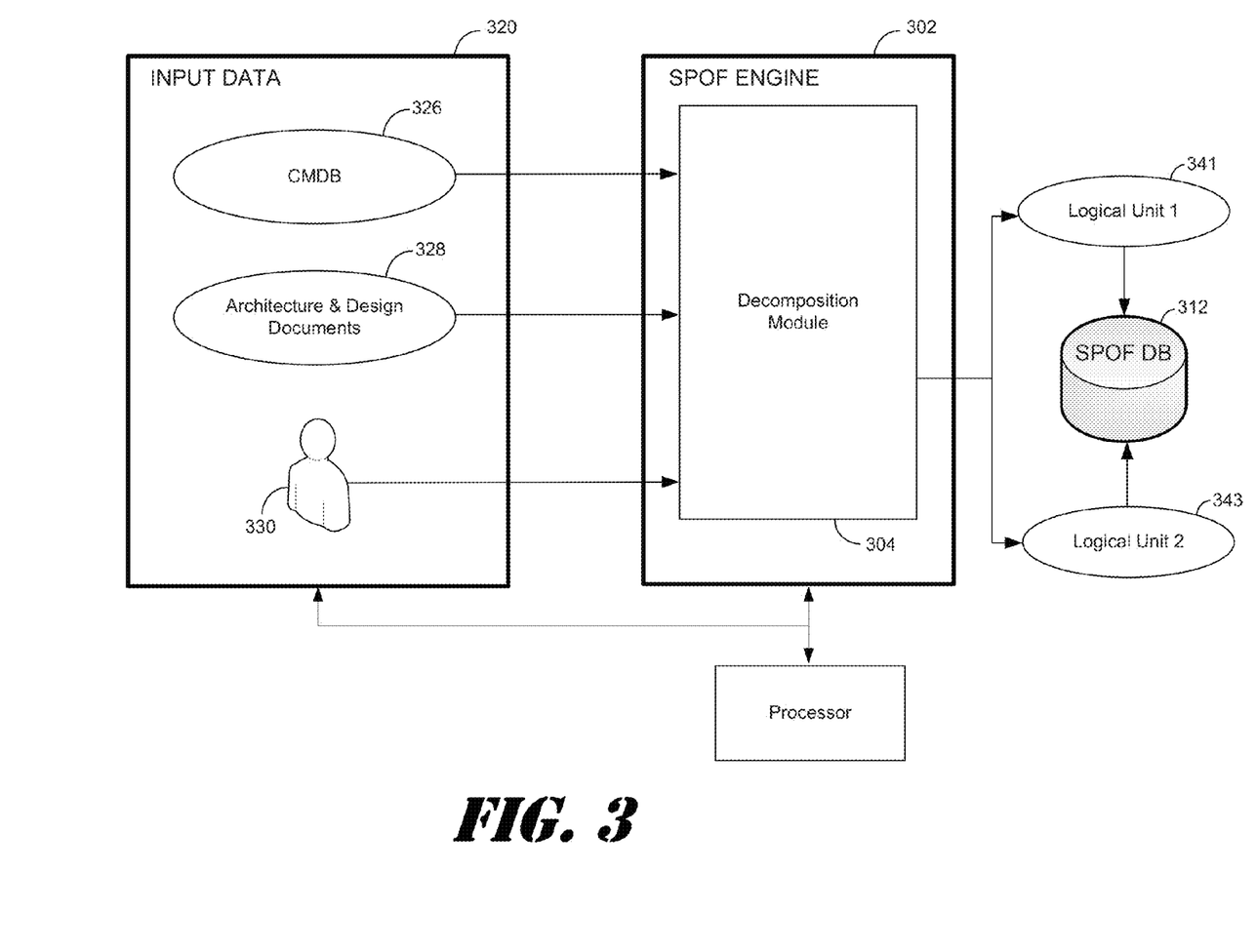
FIG. 3 is a simplified block diagram highlighting functional relationships with respect to the decomposition module of the SPOF engine in accordance with an example of the present invention.

FIG. 3 is a simplified block diagram highlighting functional relationships with respect to the decomposition module 304 in accordance with an example of the present invention. In order to define the logical units (341 and 343) the decomposition module 304 may use data called Ci_family such as network component, network configuration, server hardware (e.g., UNIX or Windows server), and/or application type for example. The information created by the decomposition module 304 will be stored in the SPOF database 312. Furthermore, decomposition module 304 utilizes data from CMDB 326 (i.e. configuration items), architecture and design documents 328, and/or the information provided by system architects and PEMs 330. According to one example, the decomposition module 304 creates logical units 341, 343 that are utilized by other SPOF engine modules (e.g., 306, 308, 310). Furthermore, each logical unit 341 and 343 may be used to separate the workload based on defined rules, such as "group all networking components or servers in a data center" for example. Based on the defined logical units 310-312 in context with the defined SPOF scope, the method of performing SPOF analysis 314 can be defined.

Moreover, an algorithm for decomposition module may include the configuration items and list of families. For instance, in the formula below, CIs represent the component/item configuration information stored within the CMDB. As known to one skilled in the art, CIs are referred to as "SYSTEMS" in which CItype characterizes the type of configurable component or item (e.g., network component (switch, router, etc.), operating system (Windows, Linux, etc.). The variable CIfamily represents a list of IT families (e.g., network component, network configuration, UNIX Server). Given the above, a sample decomposition algorithm may be as follows:

---
I. Read CIs from the CMDB
II. Loop over all CIs {
   III. Match $CI_{type}$ against $CI_{family}$
{
   Save $CI_{type}$ = family into SPOF DB
}
---

Reliability Module

Figure 4:
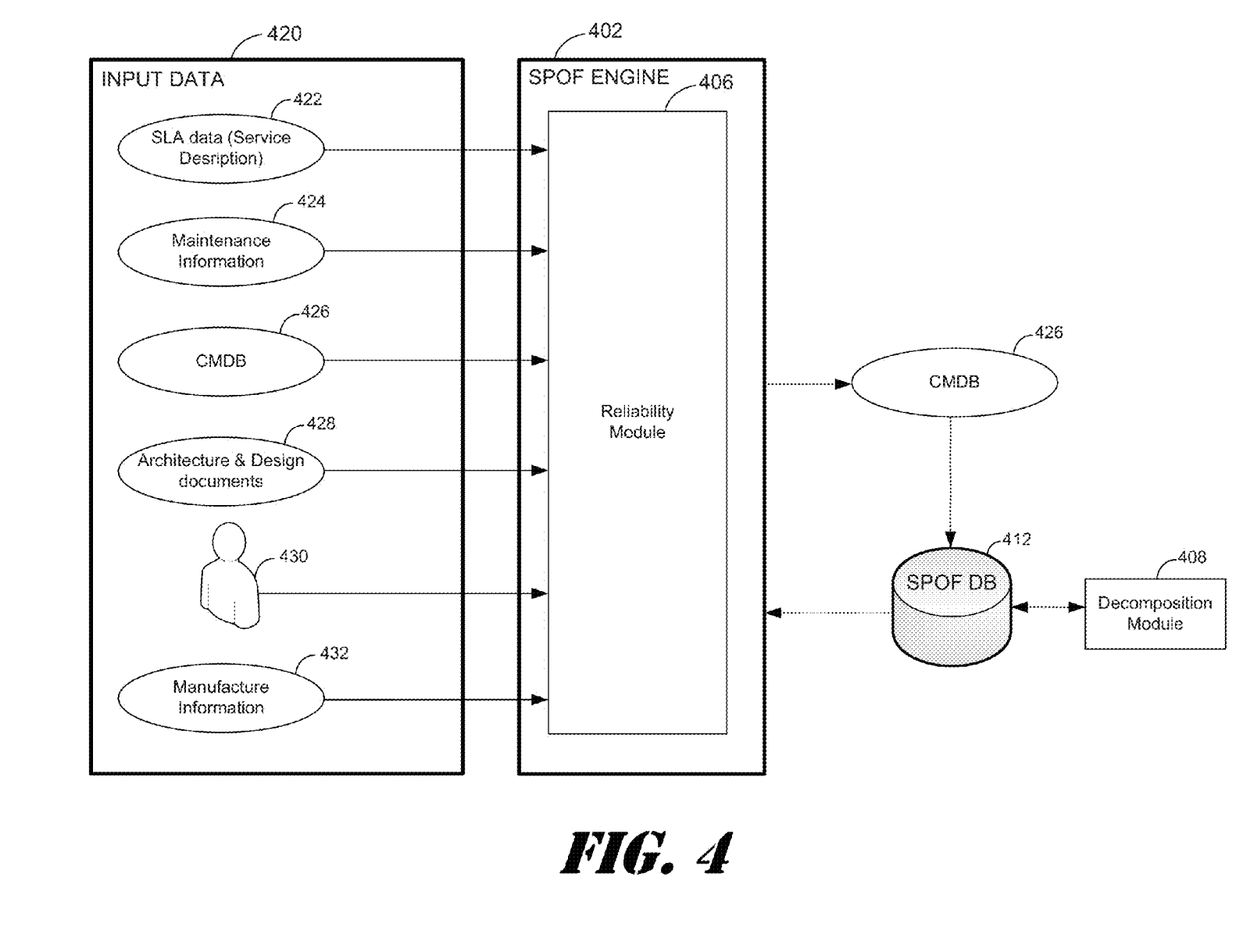
FIG. 4 is a simplified block diagram highlighting functional relationships with respect to the reliability module of the SPOF engine in accordance with an example of the present invention.

FIG. 4 is a simplified block diagram highlighting functional relationships with respect to the reliability module of the SPOF engine in accordance with an example of the present invention. The reliability module 406 is configured to calculate the reliability of each configurable system component, or configuration item (CI), in order to ensure the dependability module 406 of the SPOF engine 402 is capable of detecting weak components, weak connections, and single points of failure. The reliability module 406 uses input information 420 including SLA data 422 such as the required availability of components, manufacturer information 432 such as the MTTR (mean-time-to-repair), architecture and design documents 428 such as load balancing calculations, and maintenance information 424 such as the failure statistics at the component and/or system level. The input data 420 may then be applied to all configuration items (CIs) which the reliability module 406 reads from the CMDB 426 so as to create assessed information including CIAge, CIComplexity, and CIMTBF. The failure rate (CIReliability) is calculated and stored in the SPOF database 412. A sample algorithm of the reliability module and process flow includes:

---
I. Read CIs from CMDB
II. Read CItype from SPOF DB
III. Loop over all CIs {
IV. Assess CIAge
V. Assess CIComplexity
VI. Assess CIMTBF
VII. Calculate CIReliability
VIII. Save CIReliability into SPOF DB
---

Dependency Module

Figure 5:
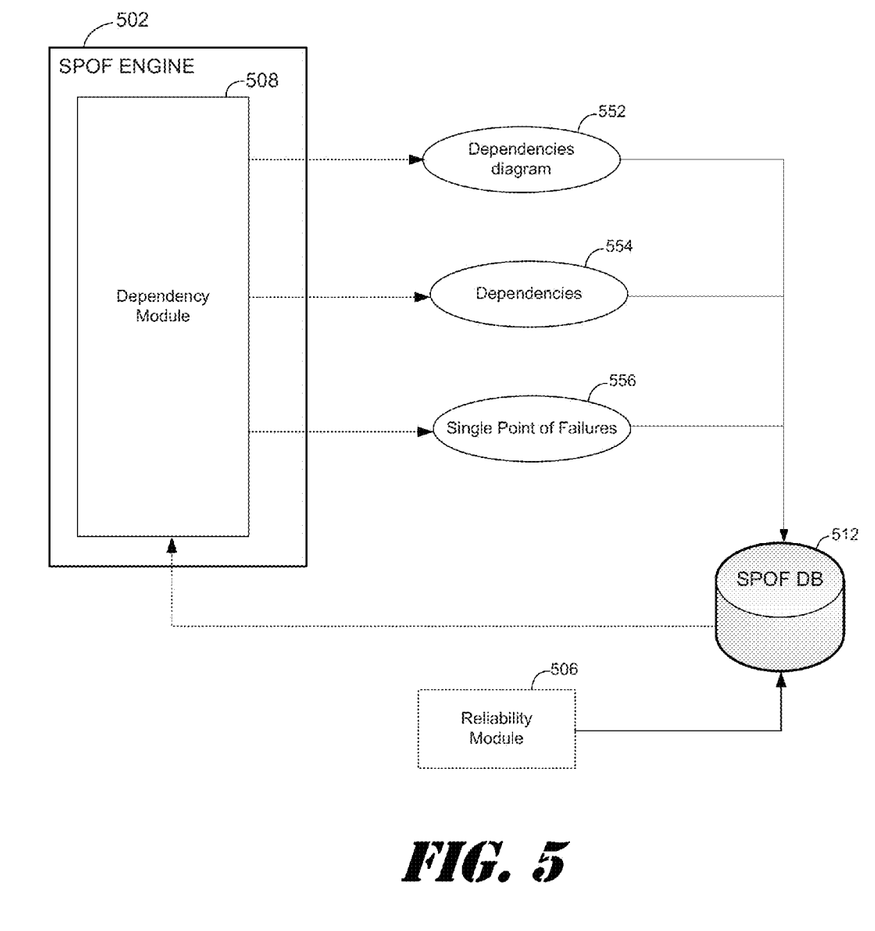
FIG. 5 is a simplified block diagram highlighting functional relationships with respect to the dependency module of the SPOF engine in accordance with an example of the present invention.

FIG. 5 is simplified block diagram highlighting functional relationships with respect to the dependency module of the SPOF engine in accordance with an example of the present invention. As shown here, FIG. 5 illustrates the dependency module 508 including input and output data. One objective of the dependency module 508 is to delineate and provide a logical graph or dependency diagram 552 of all dependencies of a logical unit defined by the decomposition module 504. Based on the logical graph, the dependency module 508 may then read all configuration item information (CI data) from both the CMDB 526 and SPOF database 512 such that all dependencies between the CI are assessed. Based on the reliability of each CI and the type and number of dependencies, the dependency module 508 is able to calculate the dependability of each CI. The level of dependability for each component is expressed in the SPOF 556 (e.g., weak component, limited redundancy, redundant, or strong component). Computation of the dependency diagram 552, dependencies 554, and SPOF dependency 556, is stored in the SPOF database 512. A sample algorithm of the dependency module and process flow includes:

---
I. Read CIs from CMDB
II. Read CIRelations from CMDB
III. Read CIReliability from SPOF DB
IV. USE Depth First Search Algorithm of Graph Theory
   a. every node (CI) in the graph (dependency diagram) is visited twice over different path
V. if not visited twice
   a. flag CIDependability = SPOF
VI. Save CIDependability into SPOF DB
---

Remediation Module

Figure 6:
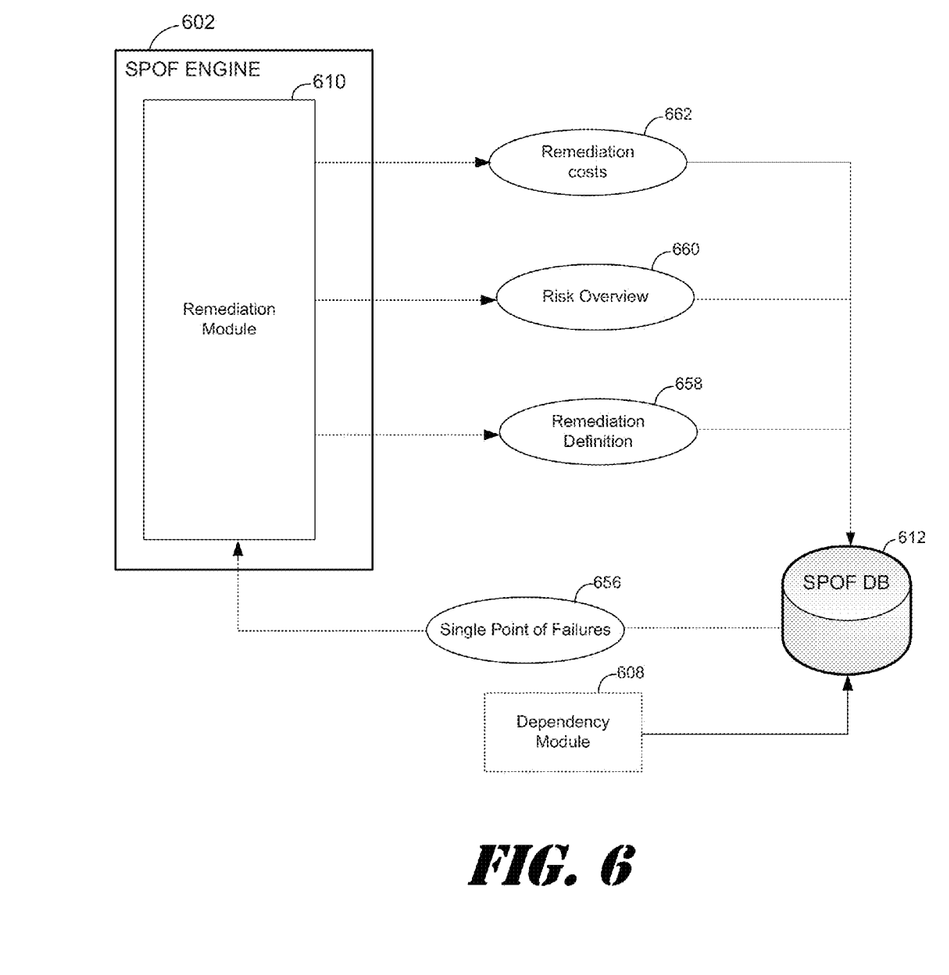
FIG. 6 is a simplified block diagram highlighting functional relationships with respect to the remediation module of the SPOF engine in accordance with an example of the present invention.

FIG. 6 is a simplified block diagram highlighting functional relationships with respect to the remediation module of the SPOF engine in accordance with an example of the present invention. In one instance, the remediation module 610 is configured to propose the correct remediation(s) for the identified single point(s) of failure. The remediation module 610 retrieves all single point(s) of failure 656 from the SPOF database 612 and all information related to the configuration items (CIs) which may affect the identified single point(s) of failure 656. According to one example, the list of remediation(s) 658 may contain suggestions for successful remediation such as "define redundant routing for a network core layer" if the SPOF is routing-related (e.g., lacks redundancy), or "cluster and load balance web servers" if the web server is a single point of failure. The identified remediation(s) 658 are then stored in the SPOF database 612 along with the associated remediation cost estimations 662 and the risk overview information 660. As such, the SPOF database 612 will contain a multitude of remediation suggestions for common single point(s) of failure problems. A sample algorithm of the remediation module and process flow includes:

---
I. Read CIs from CMDB
II. Read CIRelations from CMDB
III. Read CIFailureRating from SPOF DB
IV. Loop over all CIs {
   a. If CIFailureRating equals high {
      i. Lookup remediation in SPOF DB
      ii. Print Remediation suggestion
   }
}
---

Figure 7A:
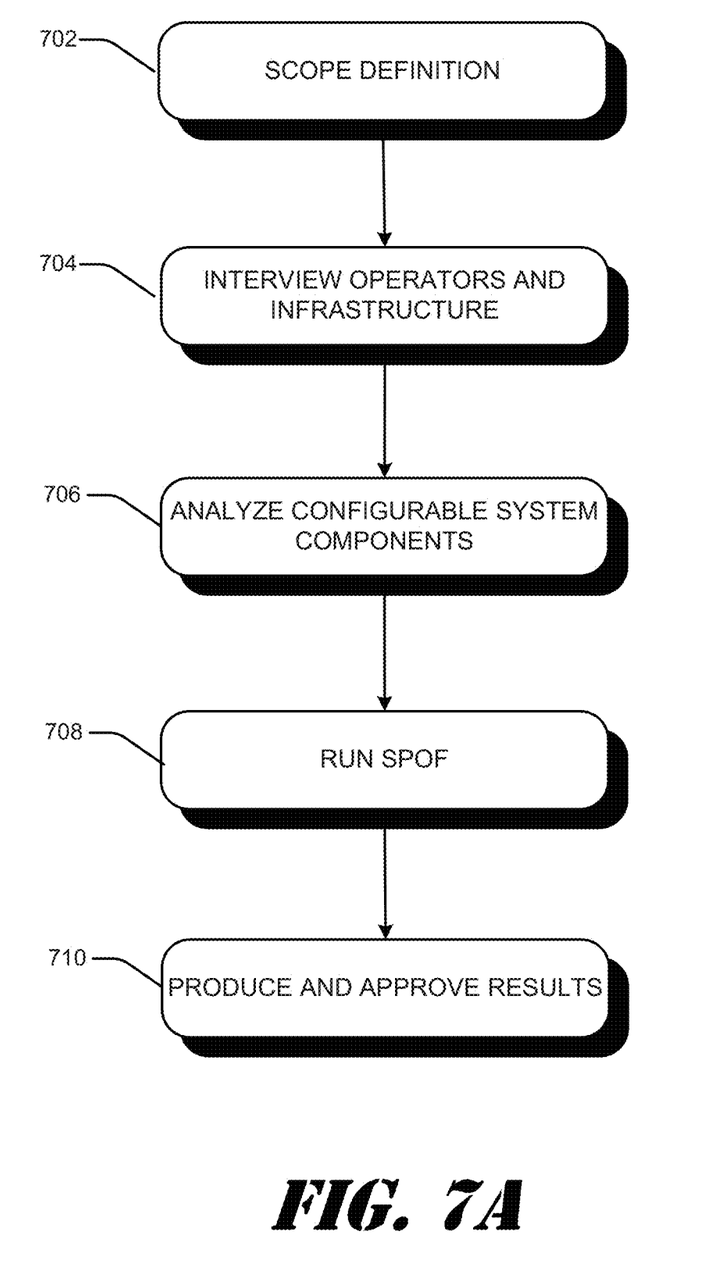
FIG. 7A is a simplified flow chart of the processing steps for SPOF engine and SPOF analysis and remediation in accordance with example of the present invention.
Figure 7B:
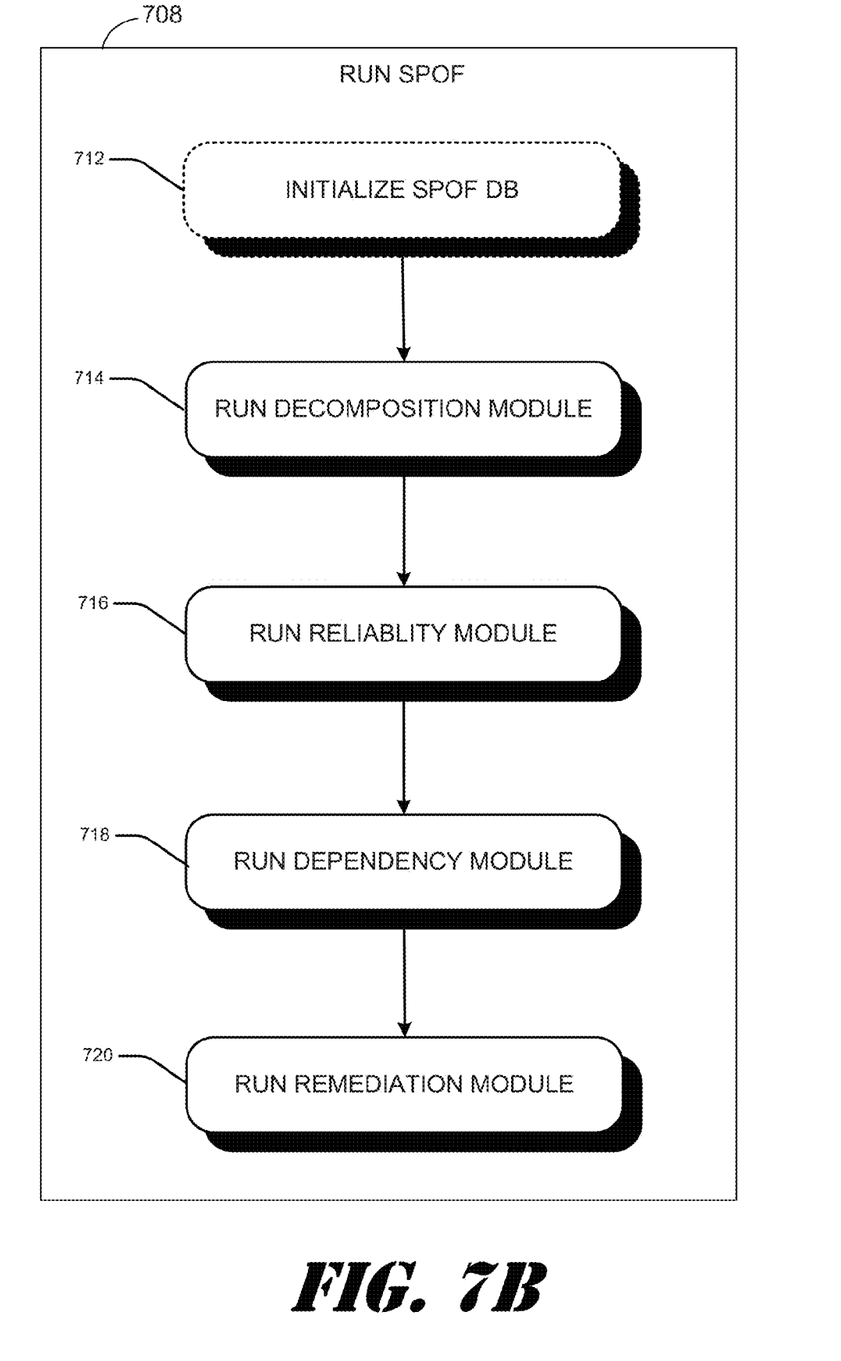
FIG. 7B is a simplified flow chart of the process flow within the SPFO engine of FIG. 7A in accordance with an example of the present invention.

FIGS. 7A-7B illustrates SPOF analysis process in accordance with an example of the invention. With reference to FIG. 7A, process 700 operates to achieve the SPOF analysis described herein. According to one example, FIG. 7A illustrate processes which are performed manually and independent from the SPOF Engine. In step 702, process 700 may define the analysis scope of the SPOF analysis which will be executed. The scope definitions can limit the range for the SPOF analysis to predetermined instances such as applications being vital for business, pre-production applications, or test and development systems for example. The analysis scope may also define those particular adapters of network device adapter and/or IP addresses that will not be considered for the present SPOF analysis. Next, in step 704, process 700 involves conducting one or more interviews with Technical Architects (TA) and the responsible Production Environment Management (PEM). The object of the interview is to gather additional information regarding the current system architecture and identify components which are to be considered based on the scope of the SPOF analysis. Furthermore, additional details regarding system outages, known weaknesses, and/or reliability characteristics of components may also be collected at this time. In step 706, process 700 analyzes current documents and information with responsible architects and system owners in order to gain a better understanding of the entire operation and computing system. More particularly, during these interview sessions, with the system architects will benefit from the expertise of the domain experts, or subject matter experts (SMEs).

In step 708, the SPOF analysis is performed using a SPOF engine in accordance with an example of the present invention. The process 708 performed inside the SPOF engine is described in further detail with respect to FIG. 7B and processing steps 712 to 720. Thereafter, the results of the SPOF analysis are created and produced by the SPOF engine for discussion by the responsible environment management and architects in step 710. Based on the results, the SPOF analysis may then be approved by the network management operator.

Referring now to FIG. 7B, process 708 may operate within a SPOF Engine 102 (for example executed by a processor) to achieve the SPOF analysis in accordance with examples of the present invention. In step 712, the first step inside the SPOF engine is executed by initializing the SPOF database. For instance, an initial phase download instruction may execute for collecting all necessary information from multiple external sources, such as CMDB 126, SLA data repository and others for example. Consequently, all information and data needed for performing the desired SPOF analysis is available inside the SPOF engine. In step 714, process 708 runs the first step inside the SPOF engine by using the decomposition module. As described above, the decomposition module splits the defined workload into separated logical units, for example a number of servers or network devices in a data center. According to one example, the logical units are created based on defined rules. For example, a rule could be defined as the selection of all mainframe components in a data center. Henceforth, the method of performing SPOF analysis may then be defined based on the results of both the project scope definition and the decomposition module.

In step 716, process 708 may run the reliability module 106. One function of the reliability module is to measure and determine the reliability of each component in the system or defined for analysis (SPOF scope). In one example, the reliability module 106 functions as the foundation for risk calculation and weakness determination. In particular, the reliability module utilizes data from CMDB and reliability numbers and then rates each component and stores the results into the SPOF database. In step 718, process 708 may run the dependency module. Here, the dependency module is configured to determine all dependencies between configuration items (CIs) or systems. Specifically, the dependency module is configured to identify all CIs with low or no redundancies (e.g., predetermined threshold of 1 or less). The dependency module retrieves all necessary information from the information sources like CMDB and SPOF database. According to one implementation, a graph walk algorithm may be used to confirm all CIs are accessible over two paths in order to determine proper dependency. In step 720, process 708 may run the remediation module. As mentioned above, the remediation module analyzes the components and relationships to verify that all relationships are redundant. The remediation module is further configured to provide suggestions for architects of possible remediation while also delivering information that relates to the impact failure caused by redundancy or lack thereof.

According to one example embodiment, the SPOF engine may create different reports which can be used to evaluate the single point(s) of failure and the risks for analyzed systems. In order to create the various reports, the processes 702, 704, 706, 708, 710 of SPOF sequence 700 and the running processes associated with process 708 inside the SPOF engine should be performed. That is, and in accordance with one implementation, the plurality of reports are created based on the phase of the SPOF analysis.

The created reports may be stored into the SPOF database 112. One report is the list of all impacted configuration items/components and their dependencies (e.g., dependency report). The remediation report includes information such as description of remediation(s), list of remediation(s), and the remediation costs. Based on the results, a risk overview report is created to show the current risks for the analyzed environment. Lastly, a SPOF report including all detected single point(s) of failure is created.

Figure 8A:
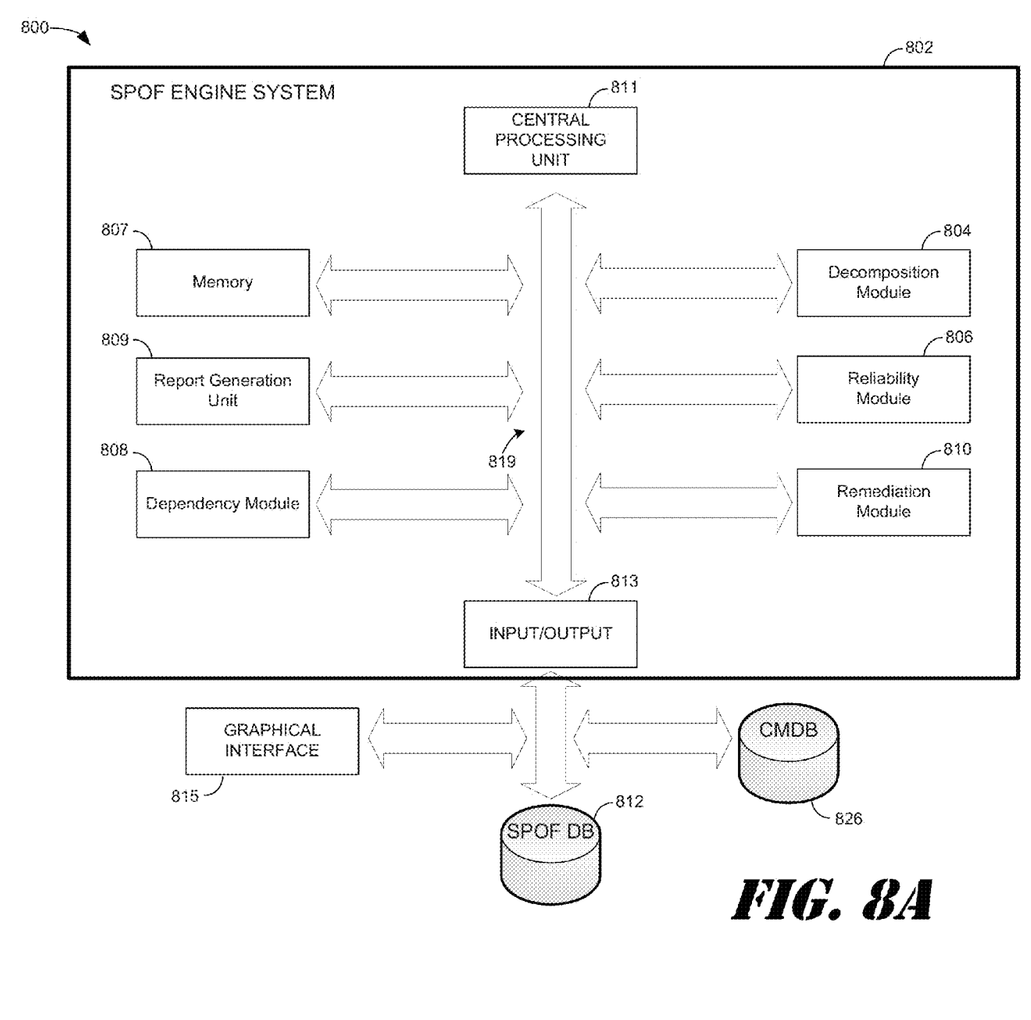
FIG. 8A is a simplified block diagram of a SPOF detection system in accordance with an embodiment of the invention.
Figure 8B:
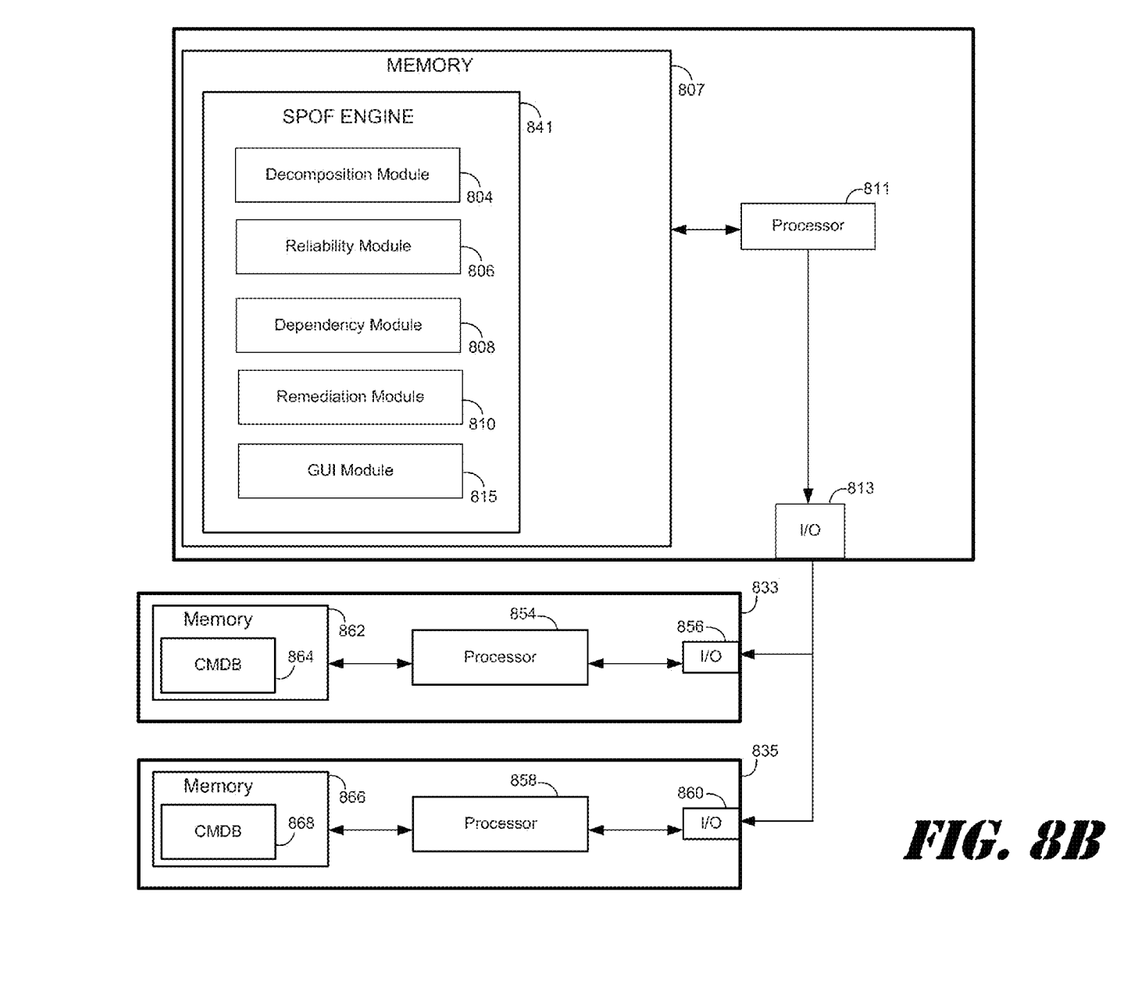
FIG. 8B illustrates another example of a system in accordance with an embodiment of the invention.

FIG. 8A is a simplified block diagram of a SPOF system in accordance with an embodiment of the invention, while FIG. 8B illustrates another example of a SPOF system in accordance with an embodiment of the invention. As shown here, system 800 includes a SPOF Engine 802, graphical interface 815, CMDB 826, and data store SPOF database 812. Graphical interface 815 may present and/or display to a user which may be an architect, one or more reports generated by SPOF engine 802. For example, the interface 815 may display dependencies 152, single point(s) of failure 156, and/or remediation costs 162 (FIG. 1). The CMDB 826 may include information relating to the hardware, server, router and operating system/applications of the IT infrastructure. SPOF database 812 may include data such as that found in SLA data repository 122, architecture and design documents 128, manufacture information 132, and/or maintenance information 124 (FIG. 1). In addition, the SPOF database 812 may include data which is created and used in various process steps (FIG. 7B) performed inside the SPOF Engine 802. In accordance with one implementation, each of the data repositories may be in a single data store, or may be in individual data stores.

Furthermore, SPOF Engine 802 may include a controller or processor (CPU) 811, internal bus 819 (or similar data processor connection), input/output port 813, memory 807, report generation unit 809, dependency module 808, decomposition module 804, reliability module 806 and remediation module 810. The CPU 811 is configured to execute computer instructions stored in internal memory 807 to control dependency module 808, decomposition module 804, reliability module 806 and remediation module 810 so that an SPOF analysis may be performed. The executable instructions may be loaded in internal memory 807 from a computer readable medium connectable to system 800. Moreover, internal memory 807 may have capacity to store data locally (i.e., internally) to SPOF engine 802 in order to facilitate and enhance processing speed. In one implementation, SPOF engine 802 may read or retrieve input data from the CMDB 826, SPOF database 812 and data store(s) during execution of processing instructions.

Reference is now made to FIG. 8B, which depicts another example of a system for Single Point of Failure analysis and remediation in accordance with an example of the present invention. As shown here, FIG. 8B depicts a distributed system of computers 831, 833, 835. Computer 831 includes memory 807, processor 811 and I/O unit 813. Memory 807 includes programming modules (in software) for decomposition module 804, reliability module 806, dependency module 808, remediation module 810 and a graphic user interface module(s) 815. Each of the modules 804, 806, 808, 810, 815 when executed by processor 811, may perform, for example, the processes described in FIGS. 7A-7B and also may perform functions similar to dependency module 808, decomposition module 804, reliability module 806, remediation module 810, and the graphical interface 815, which are also shown and described in FIG. 8A. Memory 807 may include for example, server storage (from which each of the modules 844, 846, 848, 850, 852 of SPOF engine 842 may be downloaded and installed (e.g. to memory of processor 811, such as RAM memory)), portable memory such as compact disk (CD) memory and/or DVD memory and system memory, such as a hard drive or solid state drive (SSD) on which modules 844, 846, 848, 850, 852 may already be installed.

As shown in FIG. 8B, computing systems 833 and 835 are coupled to computer 831. Processor 854 of computing system 833 may communicate with processor 811 of the computing system 831 through I/O unit connections 856 and 813 respectively. Similarly, processor 858 of computer 835 may communicate with processor 811 of computing system 831 through I/O unit connections 860 and 813 respectively. More particularly, processors 854, 858 may provide data to processor 811 for use in operating the software modules (844, 846, 848, 850, 852) of SPOF engine 802.

Furthermore, memory module 862 of computing system 833 may include the CMDB 864, which contains configuration and other information concerning IT infrastructure elements (similar to CMDB 126 of FIG. 1). Processor 854 of the computing system 833 may provide CMDB data (from 864) to processor 838. In the present example, memory module 866 of computer 834 includes data store(s) 868. The data store(s) 866 may include data repositories, such as the SLA data 122, maintenance information 124, and/or architecture and design documents 128 (FIG. 1). In addition, data store 866 may include an external version of the SPOF database 112 (FIG. 1). Processor 858 of the computing system 835 may provide data from data store(s) 868 to processor 813 of computing system 833. Moreover, memory modules 862 and 866 may also include for example, server storage from which information from CMDB 864 and data store(s) 868 may be downloaded and retrieved. The memory modules 862 and 866 may further include portable memory, such as compact disk (CD) memory and/or DVD memory, and system memory, such as a hard drive or solid state drive (SSD) on which CMDB 864 and data store(s) 868 files may already be installed.

Embodiments of the present invention provide a system and method for single point of failure analysis and remediation. Many advantages are afforded by the system and method in accordance with the present examples. For instance, the present configuration helps to reduce the operational risks for IT businesses. Furthermore, the SPOF analysis and remediation system servers to improve the trust of enterprise service providers by improving system stability. As a result, networking architects are empowered with a tool to effectively and efficiently manage and resolve potential single point(s) of failure problems.

Furthermore, while the invention has been described with respect to exemplary embodiments, one skilled in the art will recognize that numerous modifications are possible. For example, although exemplary embodiments describe the SPOF system in the context of computer systems, the invention is not limited thereto. For example, the present configuration is equally applicable to a plethora of electronic computing systems including personal computers, large-scale servers, telecommunication systems, and computing systems relating to transportation (e.g., automobile, airplane, etc.). Thus, although the invention has been described with respect to exemplary embodiments, it will be appreciated that the invention is intended to cover all modifications and equivalents within the scope of the following claims.

What is claimed is:

1. A computer-implemented method for single point of failure (SPOF) analysis and remediation, the method comprising:
    performing a SPOF analysis based on configuration information of a plurality of system components, including:
        retrieving configuration information of the plurality of components from a SPOF database;
        allocating, via a decomposition module, the plurality of components into separate logical units based on pre-defined rules; and
        for each of the separate logical units, assessing, via a reliability module, a reliability rating of each component within the logical unit;
    identifying, based on the SPOF analysis, at least one SPOF component from the plurality of system components; and
    determining remediation information for the at least one SPOF component based on SPOF analysis and configuration information; and
    displaying results of the SPOF analysis and the remediation information.

2. The method of claim 1, further comprising:
    defining the scope of the SPOF analysis; and
    retrieving configuration information relating to components within the defined scope of the SPOF analysis, such that the SPOF analysis is performed based on the defined scope of the SPOF analysis.

3. The method of claim 2, wherein the performing the SPOF analysis further comprises:
    identifying, via a dependency module, a dependability level of the plurality of components based on the reliability rating so as to determine at least one SPOF component having a dependability level below a predetermined threshold; and
    analyzing, via a remediation module, configuration information of affected components associated with the SPOF component so as to provide at least one remediation suggestion for the at least one SPOF component.

4. The method of claim 3, further comprising:
    displaying, on a graphical user interface, the at least one remediation suggestion for the at least one SPOF component.

5. The method of claim 3, wherein the dependability level includes the redundancy status of each of the plurality of components.

6. The method of claim 3, wherein the dependency module is configured to output to the SPOF database a dependency diagram associated with the plurality of system components including a type of dependency and the number of dependencies for each component.

7. The method of claim 6, wherein the dependability level of a component is based on the reliability level, the type of dependency, and the number of dependencies.

8. The method of claim 7, further comprising:
displaying, on a graphical user interface, both an overview of risks and remediation costs associated with the identified at least one SPOF component.

9. A system for single point of failure (SPOF) analysis and remediation, the system comprising:
a processor; and
memory comprising a SPOF engine executable by the processor to receive input data factors and configuration information associated with a plurality of system components, and executable by the processor to perform a SPOF analysis based on configuration information of a plurality of system components and wherein the SPOF engine comprises:
a decomposition module executable by the processor to allocate the workload into separate logical units based on predefined rules;
a reliability module executable by the processor to, for each of the separate logical units, assess a reliability rating of each component within the logical unit;
a dependency module executable by the processor to identify a dependability level of the plurality of components based on the reliability rating so as to determine at least one SPOF component having a dependability level below a predetermined threshold; and
a remediation module executable by the processor to analyze configuration information of affected components associated with the SPOF component so as to provide at least one remediation suggestion for the at least one SPOF component;
a SPOF database to store SPOF analysis information from the SPOF engine,
wherein at least one remediation option for an identified SPOF component is determined in response to the SPOF analysis; and
wherein results of the SPOF analysis and the at least one remediation option are displayed to an operating user.

10. The system of claim 9, further comprising:
a configuration and management database for storing the configuration information associated with each of the plurality of components.

11. The system of claim 10, wherein the dependability level includes the redundancy status of each of the plurality of components and is based on the reliability level, the type of dependency, and the number of dependencies.

12. The method of claim 10, wherein the dependency module is configured to output to the SPOF database a dependency diagram associated with the plurality of system components including a type of dependency and the number of dependencies for each system component.

13. A computer readable storage medium having stored executable instructions, that when executed by a processor, cause the processor to:
receive a scope definition for a SPOF analysis;
retrieve configuration information relating to components within the defined scope of the SPOF analysis;
allocate the plurality of components into separate logical units based on predefined rules;
for each of the separate logical units, assess a reliability rating of each component within the logical unit;
identify a dependability level of the plurality of components based on the reliability rating so as to determine at least one SPOF component having a dependability level below a predetermined threshold;
analyze configuration information of affected components associated with the SPOF component so as to compute at least one remediation suggestion for the at least one SPOF component; and
display, via a graphical user interface, a notification relating to at least one SPOF component and at least one remediation suggestion for said component.

* * * * *